March 21, 1939.  J. H. WOODBERRY  2,150,956
PRESSURE INDICATOR
Filed Sept. 25, 1936
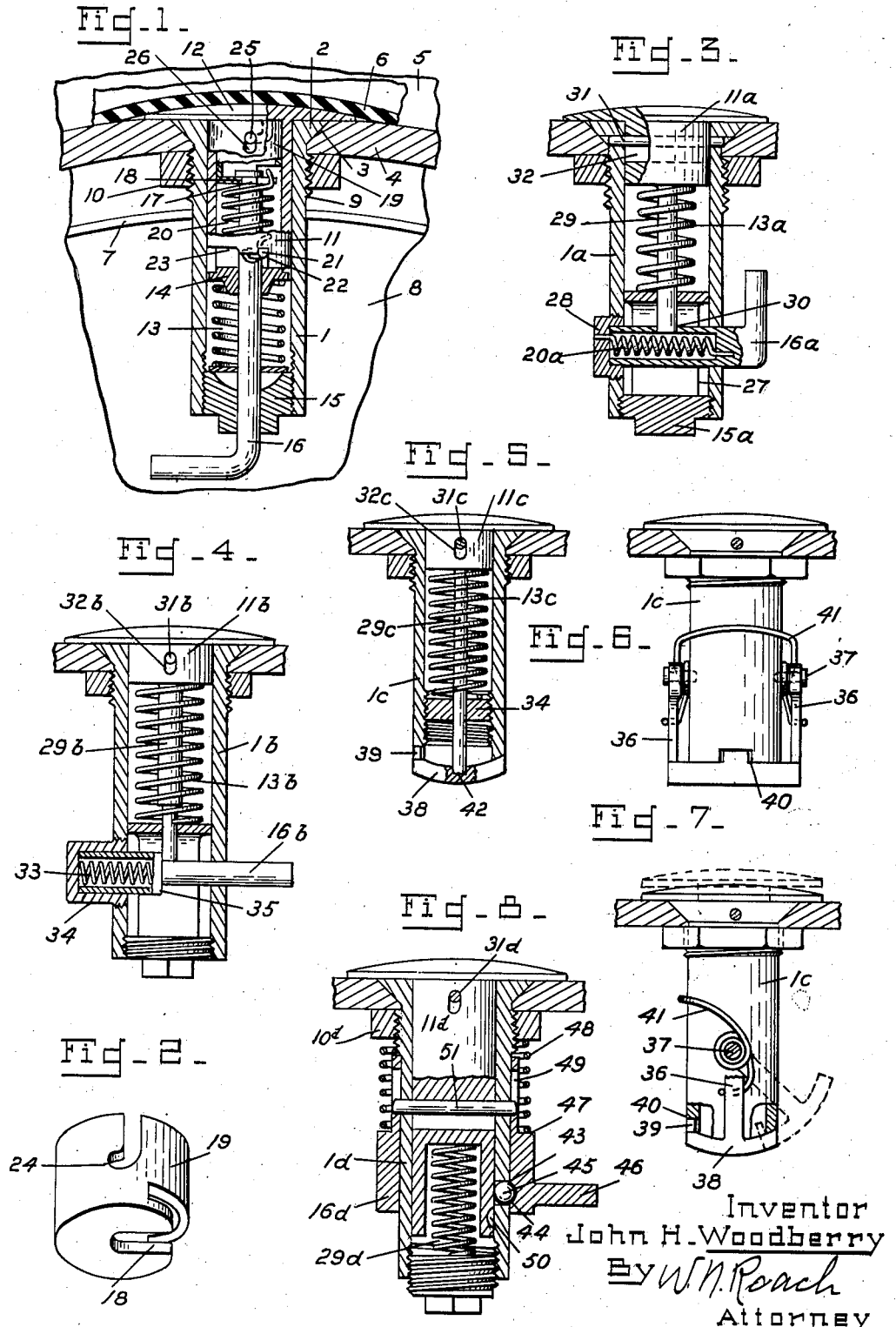
Inventor
John H. Woodberry
By W. N. Roach
Attorney Patented Mar. 21, 1939

2,150,956

UNITED STATES PATENT OFFICE 2,150,956

PRESSURE INDICATOR

John H. Woodberry, Washington, D. C.

Application September 25, 1936, Serial No. 102,544

2 Claims. (Cl. 116—34)

(Granted under the act of March 3, 1883, as amended April 30, 1928; 370 O. G. 757)

The invention described herein may be manufactured and used by or for the Government for governmental purposes, without the payment to me of any royalty thereon.

The subject of this invention is a pressure indicator intended primarily for use with pneumatic tires.

A main source of damage to pneumatic tires is traveling on under inflated tires. This may occur by reason of failure to properly inflate the tires or through a puncture causing a leak in the tire.

The prime object of the present invention is the provision of simple and efficient means for indicating when the pressure in a tire has fallen below the normal operating pressure for that tire.

This object is accomplished broadly by providing a suitable indicator actuated by means rendered operative by pressure within a tire falling without a predetermined pressure. Specifically the invention consists of a pressure element in contact with a tire, a member associated with the element, means between the element and member holding the member inoperative, but releasing the member to trip an indicator when the element moves due to the pressure within the tire falling without a predetermined pressure range.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

Practical embodiments of the invention are shown by way of illustration in the accompanying drawing, wherein:

Fig. 1 is a fragment of a wheel with a pressure indicator operating means shown in elevation in place thereon and in inoperative position;

Fig. 2 is a perspective view of the means for connecting the pressure element and the tripping member;

Fig. 3 is a longitudinal section of a modified form of the device;

Fig. 4 is a similar view of a further modification;

Fig. 5 is a similar view of a still further modification;

Fig. 6 is a side elevation of the same;

Fig. 7 is a front elevation; and

Fig. 8 is a longitudinal section of another modified form of the device.

Referring to the drawing by numerals of reference:

There is provided a housing 1 formed with a beveled head 2 to engage in the beveled aperture 3 of a tire rim 4 adapted to mount a pneumatic tire casing 5 and tube 6 upon the rim 7 of a wheel 8. The housing may be exteriorly threaded as at 9 to receive a nut 10 through which the housing is clamped in place in the tire rim 4.

The housing 1 has mounted in its inner open end a pressure element 11 movable longitudinally of the housing and formed with a head 12 for contact with the tube 6. The pressure element has pressure applied thereto in opposition to the pressure within the tube 6 and adjustable to oppose predetermined pressures within the tube which is conveniently accomplished through means of a coil spring 13 within the housing and having one end seated on the cap 14 of the pressure element 11 while its other end contacts a plug 15 threaded into the outer end of the housing 1.

Associated with the pressure element 11 is a contact member 16 formed at its outer end with an angularly disposed contact arm. The main stem of the contact member 16 is mounted in the housing 1 and passes through an aperture formed centrally of the plug 15 and also through an aperture formed in the cap 14. Adjacent to its inner end the contact member has an annular groove 17 formed therein to receive the edges of a slot 18 formed in a connection means 19 which fits within the pressure element to constrain the member against rectilinear movement with respect to the connecting means while permitting it to move angularly thereto. A torsion spring 20 surrounds the contact member 16 within the pressure element 11 and has one end engaged by the edges of the slot 18 while the other end is anchored to a pin 21 extending from the member and normally seated in a notch 22 formed in an edge 23 of the pressure element 11 produced by cutting away a portion thereof. The connecting means 19 has bayonet slots 24 formed therein to receive with a loose sliding fit a pin 25 passing through short slots 26 formed in the pressure element 11 and anchored in the housing. The bayonet slots 24 permit the connecting means 19 to be assembled with the pin 25 in place and after assembly prohibit rectilinear movement of the connecting means with respect to the housing.

The modified forms shown in Figs. 3 and 4 are similar with the exception of the contact members. In both there is a housing 1a, a pressure element 11a with a coil spring 13a and adjusting plug 15a. In these instances the spring does not seat on the plug, but a frame 27 engages the plug and spring. The frame 27 is slotted to embrace a contact member 16a in the one instance and 16b in the other. The contact member 16a is of angular formation with one arm extending transversely of the housing 1a and rotatable therein by means of a torsion spring 20a. The torsion spring may be housed in a recess formed in the contact member 16a and have one end anchored to the contact member while the other end is anchored to a screw cap 28 threaded into an aperture formed in the housing 1a and forming a bearing for one end of the contact member. The pressure element 11a in this instance is formed with a stem 29 one end of which is adapted to enter a recess 30 in the contact member 16a to normally lock the member against movement under the action of the torsion spring 20a. A pin 31 held in the aligning apertures in the housing 1a passes through a slot 32 in the pressure element to hold the element assembled while at the same time allowing sufficient movement thereof to permit the desired operation.

In the other instance as shown in Fig. 4, the contact member 16b is mounted in the housing 1b to slide transversely thereof under the influence of a compression spring 33 housed in a recess formed in the member 16b and confined between the inner end of such recess and the end of a cap 34 threaded into an aperture formed in the casing 1b and forming a support for one end of the contact member 16b. An annular shoulder 35 formed on the contact member is engaged by the attenuated end of the stem 29b of the pressure element 11b normally holding the contact member 16b against the action of the spring 33. The pressure element is in all respects similar to the one described in relation to Fig. 3.

In the modification shown in Figs. 5, 6 and 7, the housing 1c has mounted therein a pressure element 11c formed with a stem 29c which passes through an aperture in the threaded adjusting plug 34 between which and the pressure element is confined a spring 13c. The pressure element is held assembled as heretofore described by the pin 31c anchored in the housing and passing through a slot 32c, in the pressure element 11c. Carried by the housing is a contact member consisting of arms 36—36 pivotally connected by screws 37—37 at diametrically opposite locations to the housing and joined by cross-head 38 which may be provided with a suitable stop such as the lug 39 which depends from an edge of the cross head in position to pass through a slot 40 formed in the housing. A torsion spring 41 has its median portion engaging the housing and is coiled about the pivots with the ends engaging respective arms 36. The end of the stem 29c of the pressure element enters a recess 42 formed in the cross-head 38 to normally hold the contact member against action of the spring.

In the modification shown in Fig. 8, the housing 1d is formed with an aperture 43 in which is mounted a ball 44 normally projecting into a recess 45 formed in the contact member 16d which member in this instance is in the form of a sleeve slidable on the housing 1d and having an arm 46 projecting therefrom. The contact member has an annular shoulder 47 formed thereon between which and the nut 10d is confined a spring 48 tending to force the contact member in a direction axially of the housing. Slots 49 formed in the contact member 16d receive the ends of the pin 51 to limit the movement of the member under the influence of the spring.

The pressure element 11d has a recess 50 so located, that, when the element is moved by the spring 29d due to pressure in the tire falling without normal pressure ranges, it will be positioned in alignment with the ball 44 to permit the same to be forced from the recess 45 in the contact member 16d and thus free such member to be moved to operative position under the influence of the spring 48.

The operation of the device is as follows: In the preferred form the adjusting nut 15 is manipulated to tension the spring 13 to the proper amount in accordance with the pressure to be carried by the tire. When the pressure becomes too low the spring 13 forces the pressure element toward the tire the slots 26 permitting such movement, thereby releasing the pin 21 from the notch 22 and permitting the torsion spring 20 to swing the contact arm 16 through an arc of 90° to engage an alarm element not shown but similar to the element, shown in my Patent No. 2,043,277, issued June 9, 1936.

In the modified form shown in Fig. 3, when pressure in the tire drops below normal the spring 13a forces the pressure member 11a toward the tire, the slot 32 permitting such movement to the depth of the slot. The movement is sufficient to draw the end of rod 29 out of recess 30 thereby releasing contact arm 16a which is swung by torsion spring 20a to a position to contact the indicating means.

In the form shown in Fig. 4 the operation is the same as described for Fig. 3 except that when the arm 29b is moved to clear the collar 35 the spring 33 expands to force the contact arm 16b outwardly to engage the indicator.

The operation of the form shown in Figs. 5, 6 and 7 takes place when pressure in the tire falls below normal allowing spring 13c to force pressure element 11c toward the tire, the pin 31c and slot 32c limiting such movement, thereby clearing rod 29c out of recess 42 allowing arms 36 and cross head 38 to be swung about pivots 37 to the dotted position shown in Fig. 7, in which position the indicator will be contacted.

In the modification shown in Fig. 8 when pressure in the tire falls below normal the spring 29d forces the pressure element 11d toward the tire, the slots 32d and 52 permitting such movement, thus bringing the recess 50 into register with the aperture 43 which will permit the ball 44 to be forced into such recess by the pressure exerted by spring 48 in forcing contact member 16d axially of the housing. The pin 51 will bring the contact member to rest in its new position when the ends of the slots 49 are reached, in which position the arm 46 will contact an indicator.

I claim:

1. An operating mechanism for tire pressure indicators embodying a housing having an open end, means for securing the housing in fixed relation to a wheel rim with the open end directed towards a pneumatic tire carried by the rim, a pressure element having a notch and also having a slot therein, said element movable axially of the housing and adapted to contact the tire, a pin carried by the housing and passing through the slot in the pressure element to limit axial movement thereof, means normally urging the pressure element towards the tire, a connecting member having bayonet slots receiving the pin, a contact member rotatably carried by the connecting member, a torsion spring normally tending to rotate the contact member, and means on the contact member normally engageable in the notch of the pressure element and disengageable therefrom on movement of the pressure element.

2. An operating mechanism for tire pressure indicators embodying an axially movable pressure element adapted to move towards a pneumatic tire, means for moving said element, means for limiting movement thereof, a rotatably mounted contact member normally held against rotation by engagement with the pressure element and disengageable therefrom on axial movement of said element, means normally tending to rotate the contact member, and a connecting member rotatably carrying the contact member and held against axial movement by the limiting means.

JOHN H. WOODBERRY.